United States Patent [19]

Alleaume et al.

[11] Patent Number: 5,132,055
[45] Date of Patent: Jul. 21, 1992

[54] FLUID DISTRIBUTOR FOR HEAT AND MATERIAL EXCHANGE COLUMN, FOR EXAMPLE WITH LINING, AND COLUMN PROVIDED WITH SUCH DISTRIBUTOR

[75] Inventors: Jean-Francois Alleaume, Rouen; Patrice Andre, St Etienne de Montlec; Christian Barbe, Fontenay Aux Roses; Maurice Bosquain, Sommecaise; Jean-Yves Lehman, Maisons Alfort; Pierre Jeannot, Saint Maur Des Fosses, all of France; Francois Darchis, Oakland, Calif.

[73] Assignee: L'Air Liquide, Societe Anonyme pour l'Etude et l'Exploitation des Procedes Georges Claude, Paris, France

[21] Appl. No.: 626,474

[22] Filed: Dec. 12, 1990

[30] Foreign Application Priority Data

Dec. 14, 1989 [FR] France .................. 89 16570

[51] Int. Cl.⁵ .................... B01F 3/04
[52] U.S. Cl. .................... 261/97; 261/114.5
[58] Field of Search ............ 261/97, 112.2, 114.5

[56] References Cited

U.S. PATENT DOCUMENTS

| | | | |
|---|---|---|---|
| 2,714,504 | 8/1955 | Bowles | 261/114.5 |
| 3,070,360 | 12/1962 | Rafferty | 261/113 |
| 3,259,380 | 7/1966 | Brown | 261/97 |
| 3,523,762 | 8/1970 | Broughton | 261/97 |
| 3,937,769 | 2/1976 | Strigle, Jr. et al. | 261/97 |
| 4,427,605 | 1/1984 | Meier et al. | 261/97 |
| 4,744,929 | 5/1988 | Robinson et al. | 261/97 |

FOREIGN PATENT DOCUMENTS

| | | |
|---|---|---|
| 961442 | 6/1964 | United Kingdom ....... 261/97 |
| 2046623 | 4/1979 | United Kingdom . |

OTHER PUBLICATIONS

Norton, Packed Tower Internals, Norton Co., Arkon, Ohio, 1974, 261-97.
PCT Document WO 89/10527, Nov. 2, 1989.

Primary Examiner—Tim Miles
Attorney, Agent, or Firm—Curtis, Morris & Safford

[57] ABSTRACT

This distributor comprises: a peripheral crown; a series of vertical partitions fixedly mounted on the crown at both ends thereof and extending parallel to one another; sealingly closing means bounding, between the vertical partitions, alternate spaces for collecting gas and liquid; means enabling the upward evacuation of the gas contained in the spaces for collecting gas; and a perforated bottom disposed at the base of each liquid collecting space and sealingly connected to the or each adjacent vertical partition and to the crown. Application to air distillation columns.

20 Claims, 3 Drawing Sheets

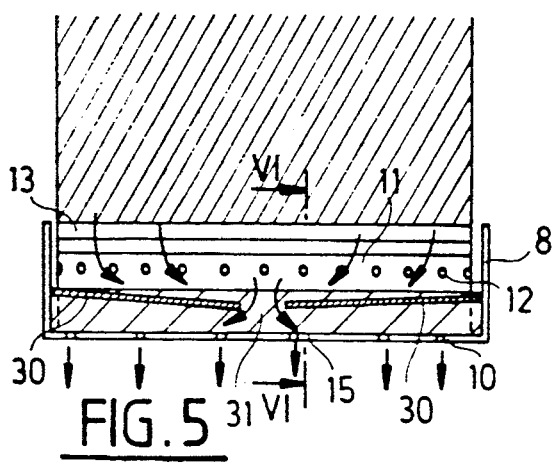
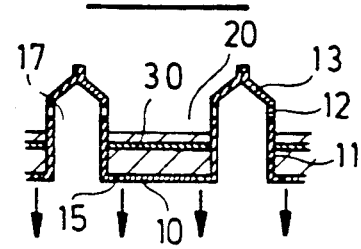
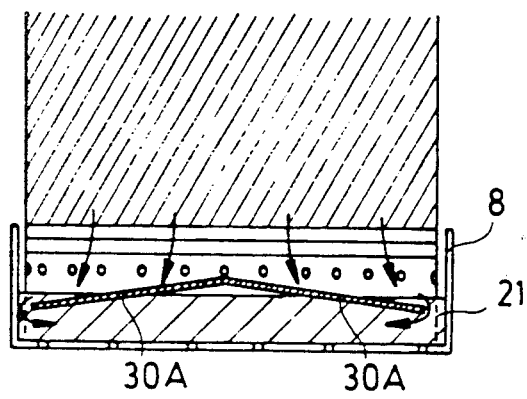
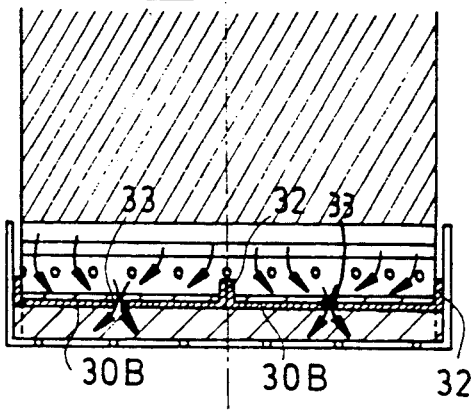
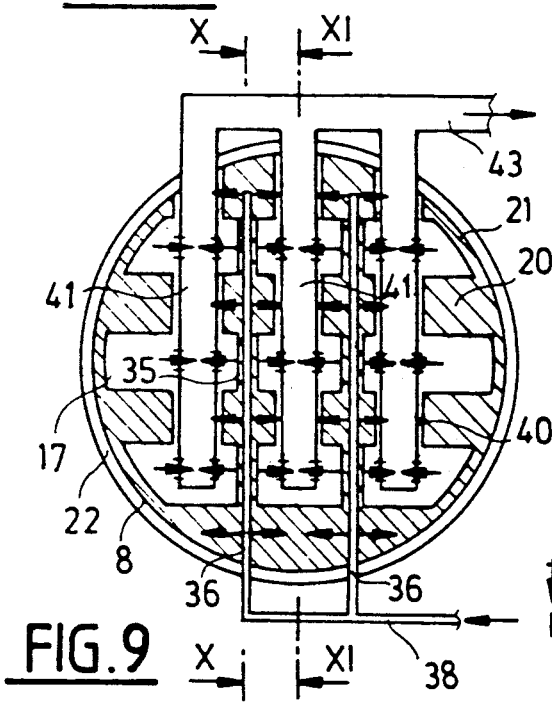
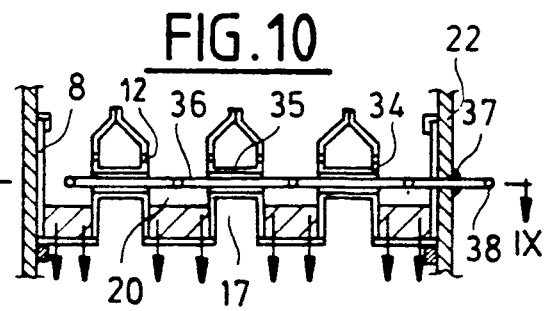
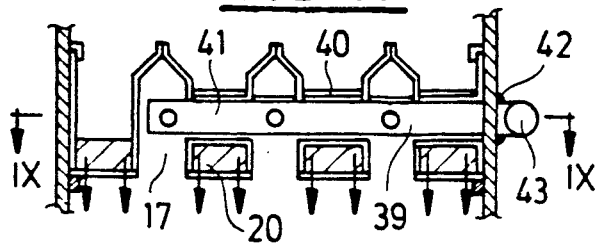

1

FLUID DISTRIBUTOR FOR HEAT AND MATERIAL EXCHANGE COLUMN, FOR EXAMPLE WITH LINING, AND COLUMN PROVIDED WITH SUCH DISTRIBUTOR

BACKGROUND OF INVENTION

1. Field of Invention

The present invention relates to a fluid distributor for heat and material exchange column, more particularly of the lining type, for example air distillation columns, of the type comprising a series of adjacent parallel extruded elements defining alternate gas and liquid spaces, each extruded element containing at least one horizontal lower wall portion provided with one row of apertures and at least one upright wall portion provided with a row of openings.

2. Description of Prior Art

A distributor of this type is described in the document GB-A-2 046 623, where the distributor is covered with a randomly arranged lining e.g. packing consisting of bulk elements.

The use of organized packings in distillation columns of the undulated crossed type, such as described in the document WO 89/10527 in the name of the Assignee and which content is understood to be incorporated herein by reference, presents important advantages, such as from the point of view of loss of charge of the rising gas. However, it has been limited to this date by the difficulty represented by the necessity of uniformly distributing the liquid at the top of each lining section.

In large diameter columns, linings of the "undulated-crossed" type are not self-supporting. Therefore, for each column section, it is not only necessary to collect the liquid which falls from the upper lining section, distribute this liquid uniformly on the lower lining section, and promote, without loss of excessive load, a good distribution of the rising gas, but it is also required to support the upper lining section along its entire surface and give a higher rest to the lower lining section.

This complicated problem has not been solved up to now in an entirely satisfactory manner: in the proposed solutions, one or more of the above functions where imperfectly fulfilled, and/or the resulting vertical congestion was excessive.

The invention aims at providing a distributor with a structure which is very rigid and little cumbersome, and which is capable of uniformly distributing the liquid while providing a good gas distribution.

SUMMARY OF INVENTION

For this purpose, the distributor according to the invention is characterized in that each extruded element has a generally U-shaped section, with substantially vertical wings each having a terminal portion which is outwardly directed and is connected with a terminal portion of the wing of an adjacent extruded element to define one of the gas spaces, a row of openings being formed in the upper part of the wing, the extruded elements being fixed at the ends of their bottom portions to a peripheral crown bounding a peripheral channel communicating with all the liquid spaces.

According to advantageous characteristics:
the distributor has, in each liquid space, at least one overflow flue having an upper end at a lower level than that of the lower edges of the openings;

the gas spaces are partially closed at their opposite ends by means of plates.

It is also an object of the invention to provide a heat and material exchange column comprising at least one distributor such as defined above, which is supported in the column by means of its peripheral crown and which directly supports through the terminal portions of the wings of its extruded elements an arranged lining section, typically with undulated-crossed plates.

BRIEF DESCRIPTION OF DRAWINGS

An embodiment of the invention will now be described with reference to the annexed drawings, in which:

FIG. 5 is a schematic vertical cross-section view of a variant of distributor according to the invention;

FIG. 6 is a partial view in cross-section according to line VI—VI of FIG. 5;

FIGS. 7 and 8 are views analogous to FIG. 5 of two other variants;

FIG. 9 is a horizontal cross-section view according to line IX—IX of FIG. 10 or of FIG. 11, of another variant of distributor according to the invention; and FIGS. 10 and 11 are cross-section views, respectively, according to lines X—X and XI—XI of FIG. 9.

DESCRIPTION OF PREFERRED EMBODIMENT

Figure 1:
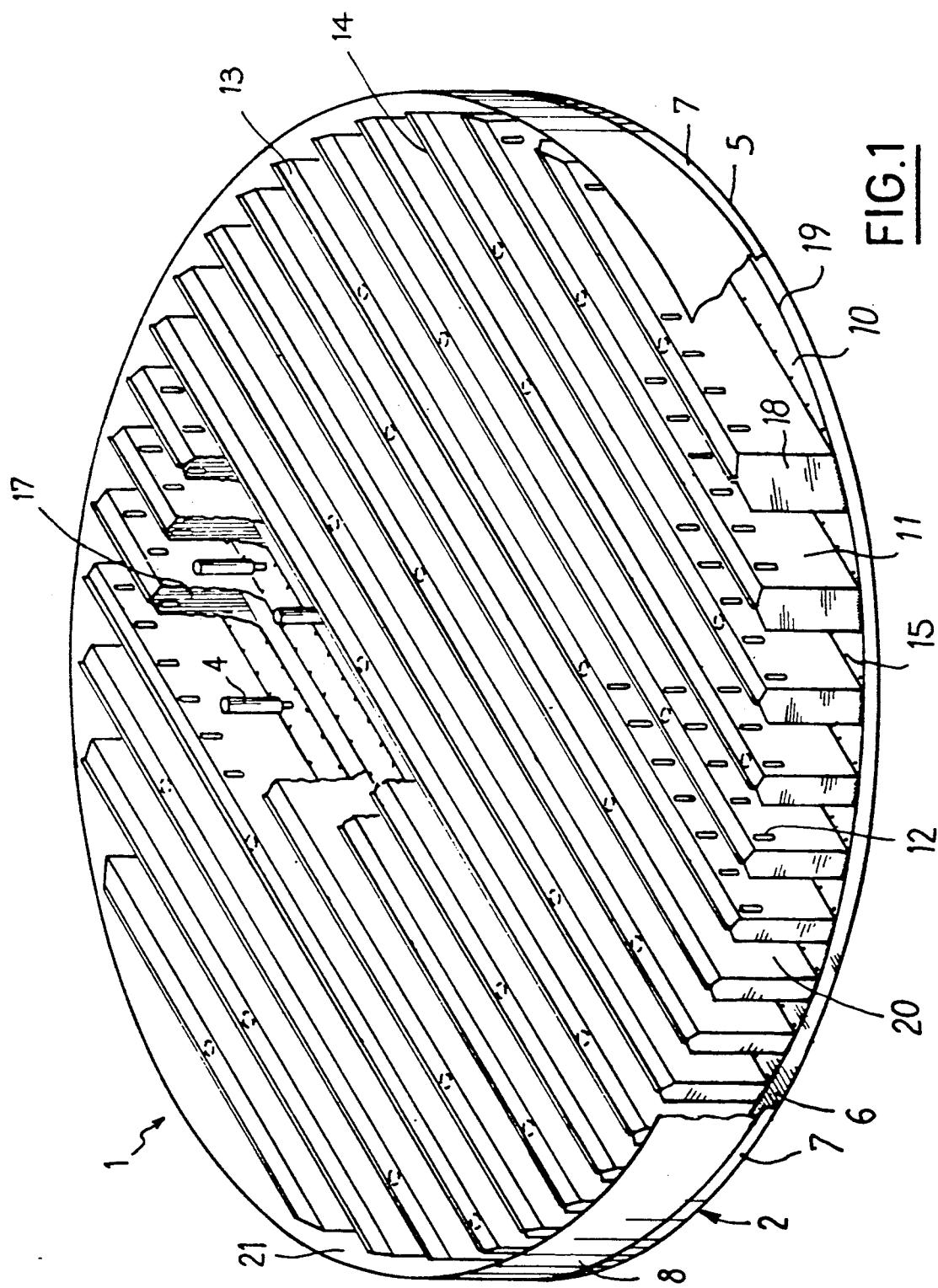
FIG. 1 is a perspective view, partially broken out, of a fluid distributor according to the invention.
Figure 2:
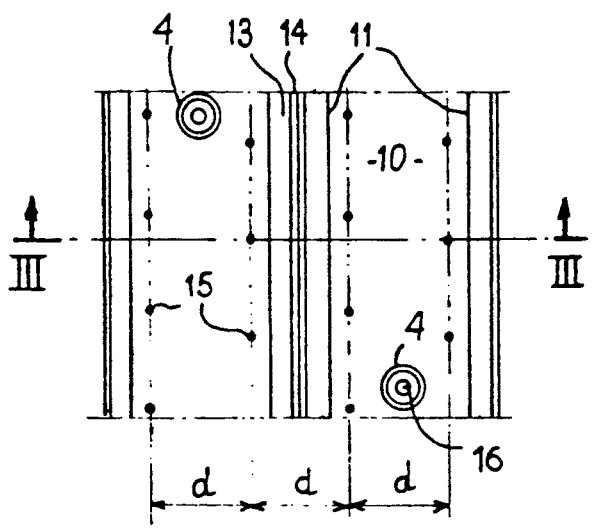
FIG. 2 is a partial view from above of the distributor of FIG. 1.
Figure 3:
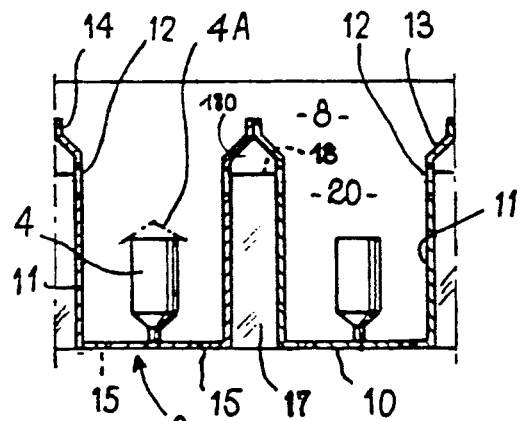
FIG. 3 is a partial cross-section view in elevation, taken along line III—III of FIG. 2.

The distributor 1 represented in FIGS. 1 to 3 consists of a peripheral crown 2, a series of U-shaped extruded members 3 and a series of overflow flues 4.

Crown 2 comprises a circular peripheral extruded member 5 which is L-shaped in cross-section, including a lower horizontal wing 6 and an upwardly directed outer edge 7. An upwardly protruding cylindrical skirt 8 is sealingly mounted on the latter.

Each extruded member 3 (FIGS. 2 and 3) consists of a perforated horizontal bottom portion 10 bound by two parallel vertical partitions 11. Each partition 11 has, along its upper edge, a horizontal row of elongated orifices 12 with long vertical axis, the orifices of one partition 11 being offset by one-half step with respect to those of the opposite partition 11.

Each partition 11 extends obliquely upwardly and outside the extruded member 3 into a half-roof 13 which ends into an upwardly directed vertical narrow edge 14.

The extruded members 3 are mounted side by side, so that their half-roofs 13 are joined together, the adjacent edges 14 being applied against one another along their entire length and being fixed together by appropriate means (not illustrated) which are impervious to liquid but not necessarily impervious to gas, for example by welding or by means of fastening points.

Each bottom portion 10 has a row of apertures 15 along each partition 11. The two rows are offset by one-half step with respect to one another, and the dimensioning of the half-roof 13 is such that as seen in plan view (FIG. 2), the distance d between the rows of apertures is the same, whether these rows pertain to the same extruded element 3 or to two adjacent extruded members. There is thus obtained a regular network of apertures 15 on the entire surface of the distributor, as seen in plan view, with one arrangement being diamond shaped.

Moreover, each bottom portion 10 has in its longitudinal median plane, at regular intervals which are clearly longer than the distance between the apertures 15, an orifice 16 of larger diameter in which the narrow lower end of a flue 4 is mounted. These flues have the shape of a funnel which rises to a level slightly lower than that of the lower edge of the orifices 12. A conical chinese hat 4A, represented in dotted line in FIG. 3, can surmount each fluc 4.

Each extruded element 3 is cut to appropriate length, transversally or obliquely, so as to rest at each end on wing 6 of crown 2. The ends of each gas space 17, defined between two adjacent extruded members, are sealingly closed, at least up to the level of the lower edge of the oblong orifices 12, by means of a vertical plate 18 of corresponding shape, which is welded along its lateral edges, whose lower edge is flush with the lower face of the bottom portions 10 and whose upper edge defines an end gas duct 180.

The lower edges of plates 18 and the ends of the bottom sections 10 are welded on wing 6 by means of a continuous sealing weld 19.

Thus, the distributor defines a certain number of spaces 20 for collecting liquid, which are bound by a bottom portion 10 and the two vertical partitions 11 of the same extruded member, these spaces 20 alternating with the gas spaces 17 mentioned above, which are spaces constituting gas ducts. The distributor also defines a peripheral channel 21, bound by the edge 7 and the skirt 8 of the crown 1, said channel communicating with the group of spaces 20.

Figure 4:
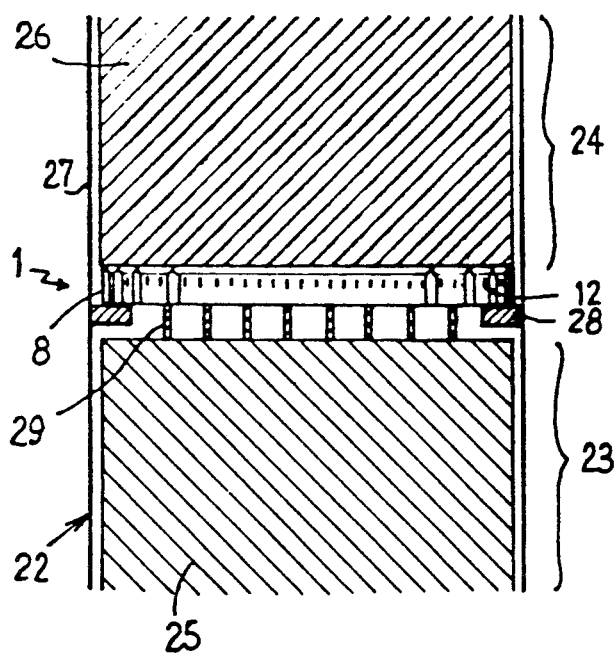
FIG. 4 is a schematic representation on a lower scale, in longitudinal cross-section, of a portion of an air distillation column provided with such distributors.

The distributor 1 is intended to be mounted in a heat and material exchange column 22 (FIG. 4) for example an air distillation column, of the type provided with an arranged lining, for example with undulated-crossed lining, such as described in the document WO 89/10527 mentioned above. A column of this type is divided into a certain number of sections 23, 24 in which each is provided with a section (or pack) of lining 25, 26 respectively. In the case of an undulated-crossed lining, each pack comprises a pile of vertical plates which are obliquely undulated, the waves of the adjacent sheets being oppositely inclined.

Above each pack, the sleeve 27 of the column is interiorly provided with supports 28 on which the crown 2 of a distributor 1 is mounted; the pack located immediately above is directly disposed on the horizontal support surface formed by the group of end portions of edges 14 of the extruded members 3 and eventually by skirt 8 of crown 2, all of which is made possible by the great rigidity of the multiple beam structure of the distributor.

The parallel plates of the lining of the pack are perpendicular to the extruded members of the distributor supporting the pack. The lining plates of two adjacent superposed lining sections 25 and 26 are parallel to one another.

Braces 29 are disposed between the pack 25 and the bottom portions 10 of distributor 1. This multiple beam structure thus prevents any upward deformation of the lower pack 25 as a result of an upward thrust which is exerted on the latter. The braces 29 are advantageously made of aligned plate elements, which are mounted on the bottom portions 10 of the extruded elements 3, parallel to the latter, and alternating with the openings 15. The braces 29 thus contribute to uniformly distribute the rising gases. Appropriate sealing means (not represented) are of course provided in the column.

In operation, the liquid falls from the entire surface of the upper pack 26 and is collected in the liquid spaces 20 and in channel 21, the latter ensuring an equilization of the level of liquid in all the spaces 20. The liquid is thereafter uniformly distributed in the lower pack 25 by means of the regular network of openings 15.

At the same time, the rising gas penetrates into the gas spaces 17 and exits therefrom through orifices 12 above the level of the liquid. Because of the respective diameters of the distributor and of the upper pack 26, it is possible to:

allow the gas to exit at the ends of the spaces 17, by limiting the height of the plates 18, as indicated in dotted line in FIG. 3;

completely block the ends of the spaces 17 by means of these plates;

not only produce this blocking, but also to remove all the orifices 12 in the vicinity of the ends of the extruded elements 3.

The gas is thus also substantially and uniformly distributed along the entire section of the column, without excessive loss of charge when passing through the distributor. Because the openings 12 are provided in the vertical partitions 11, and also because of their oblong shape, these openings present an extended total area to the passing gas, without preventing the fall of liquid on the entire surface of the distributor and without substantially reducing the mechanical inertia of the partitions 11.

If the capacity of the distributor is accidentally exceeded, the level of liquid rises to the top of the flues 4, which then ensure a macroscopic regular distribution of liquid on the entire surface of the lower pack and, mainly, thus prevent any modification of the flow of gas through orifices 12.

It should be noted that the distributor provided above the highest pack of the column may be prepared by removing the half-roofs 13 and, thereafter, the orifices 12, provided the column comprises means for feeding liquid, in the head portion of the column, directly into the channel 21. The group of vertical partitions 11 confer however to the distributor a very high rigidity which makes it self carrying even for large diameter columns, of the order of many meters.

With certain types of linings, the composition of the liquid is somewhat heterogeneous along the section of the pack because of an imperfect redistribution of the liquid which descends along the pack and the "edge effects". If this heterogeneity may have unfavourable consequences at a given level of the column, one of the variants represented in FIGS. 5-6, 7 and 8 may be used.

In the variant of FIGS. 5 and 6, two plates 30 are fixedly mounted in each liquid space 20. Each plate 30 has the same width as the space 20. It starts at one corresponding end of this space 20 (in practice of the skirt 8) and slowly goes down towards the middle of this space. Thus, each pair of plates 30 defines a widely opened V by providing a free opening 31 therebetween.

In operation, as indicated by the arrows of FIG. 5, all the liquid which falls from the upper pack first reaches the plates 30 after which is combined in the middle of these spaces 20, then, after having passed through the openings 31, is redistributed therealong. Thus, all the liquid is homogenized and the liquid which falls on the entire surface of the lower pack through the apertures 15 has a substantially uniform composition.

As indicated in FIG. 7, the two plates 30 can be replaced by plates 30A to form a widely flaired roof, the plates being connected at mid-length of the space 20 and ending at each end of these spaces, at a short distance of the skirt 8. Thus, as indicated by the arrows the liquid which falls from the upper pack is divided into two flows which are directed until reaching the peripheral channel 21, after which it is redistributed along the entire length of the spaces 20.

FIG. 8 shows another way of homogenizing the liquid in the distributor: the plates 30 of FIG. 5 are replaced by four plates 30B. Each plate 30B is horizontal and has an upwardly directed vertical edge 32 at one end. The two intermediate plates have their edges 32 standing side by side, midway of the length of the space 20. The edges 32 of the two other plates are adjacent to the skirt 8. In each half-space 20, the two plates provide a free opening 33 between their ends deprived of edges. Thus, as indicated by the arrows, the liquid which falls from the upper pack is combined on both sides of the transverse symmetrical plan P of the distributor, and each flow passes through an opening 33 and is redistributed in the corresponding half-space 20.

Another variant (not represented) consists in making a half-plate defining a channel of liquid, of appropriate longitudinal shape, unitary with each wing 11, said half-plate extending only along half the width of the space 20 and being provided with an edge along its entire length. For example, the half plates of a same space 20 can have longitudinally opposed slopes.

In each of the variants of FIGS. 5-6, 7 and 8, the plates 30, 30A, 30B can be partially or completely immersed in the liquid contained in the spaces 20 or it can completely emerged therefrom.

On the other hand, instead of these plates or in addition thereto, transversally vertical barriers (not represented) can be mounted in judiciously selected locations in spaces 20 and/or in the channel 21. Thus, in case of an accidental disequilibrium of the liquid flow which filtrates through the apertures 15, these barriers force the liquid to circulate and have a tendency to equalize its level.

FIGS. 9 to 11 show how a gas can be withdrawn and a liquid added in the distillation column at the level of a distributor. It will be understood that the same arrangement enables to add gas and withdraw liquid. For clarifying the drawing, it is understood that the distributor comprises only gas spaces 17.

At regular intervals, the partitions 11 are perforated, below the apertures 12, with aligned orifices 34 which are connected together in sealing fashion, through spaces 17, by means of tubular sections 35 (FIG. 10). The liquid spaces 20 are thus in mutual communication through these sections 35. A perforated transverse tube 36 sealingly extending through the sleeve 22 of the column, to which it is fixedly mounted by means of a strand of weld 37, freely extends each row of sections 35. Outside sleeve 22, all the tubes 36 are connected to a liquid input collector 38, and they are closed at their opposite end.

In the same manner, at regular intervals which alternate with ones previously mentioned, the partitions 11 are perforated, below the apertures 12, with other orifices 29 which are aligned and sealingly combined through the spaces 20, by means of tubular sections 40 (FIG. 11). The spaces 17 are thus in mutual communication through these sections 40. A perforated transverse tube 41, sealingly extending through the sleeve 22 of the column opposite the tubes 36, freely extends through the row of sections 40. The tubes 41 are fixed to the sleeve 22 by means of a strand of weld 42. Outside the sleeve 22, all the tubes 41 are connected to a collector 43 for withdrawing gas, while they are closed at their opposite ends.

The "double rake" arrangement illustrated in FIGS. 9 to 11, enables the liquid and gas inlets/outlets to take place at the level of each distributor while having to extend the height of the column. Moreover, this arrangement gives much more flexibility of operation to the distributor.

We claim:

1. Fluid distributor for a heat and material exchange column, comprising a series of adjacent parallel elements defining alternate gas and liquid spaces, each element having at least one horizontal bottom portion provided with at least one row of apertures and at least one upright wall portion provided with an upper row of openings, each element being generally U-shaped in cross-section and including said upright wall portions each having a terminal portion which is outwardly bent and is connected with a terminal portion of the upright wall portion of an adjacent element to define one of the gas spaces, said upper row of openings being formed in the upper part of the upright wall portions and the elements being fixed by their bottom portions to a peripheral crown, each liquid space including at least one overflow flue having an upper end at a lower level than the upper row of openings.

2. Fluid distributor for a heat and material exchange column, comprising a series of adjacent parallel elements defining alternate gas and liquid spaces, each element having at least one horizontal bottom portion provided with at least one row of apertures and at least one upright wall portion provided with an upper row of openings, each element being generally U-shaped in cross-section and including said upright wall portions each having a terminal portion which is outwardly bent and is connected with a terminal portion of the upright wall portion of an adjacent element to define one of the gas spaces, said upper row of openings being formed in the upper part of the upright wall portions and the elements being fixed by their bottom portions to a peripheral crown, and an upwardly extending peripheral cylindrical skirt sealingly mounted on the peripheral crown and bounding a peripheral channel communicating with all of the liquid spaces.

3. The distributor according to claim 2 wherein the gas spaces are partially closed at opposite ends thereof by plates.

4. The distributor according to claim 2 wherein the bottom portion of each element includes two parallel rows of apertures, and wherein all of the apertures of the distributor form a diamond shaped regular network.

5. The distributor according to claim 2 wherein the openings are vertically elongated.

6. The distributor according to claim 2 wherein the openings in two adjacent upright wall portions are offset with respect to one another.

7. The distributor according to claim 2 further comprising at least one pair of plates positioned in each liquid space for redistribution along said liquid space of liquid which comes in contact with the distributor.

8. The distributor according to claim 2 wherein the upright wall portions include rows of aligned orifices sealingly connected by means of tubular sections through which extend perforated tubes through which pass liquid and gas, respectively, respective groups of tubes being connected at one end by means of respective collectors.

9. A heat and material exchange column comprising at least one distributor having a series of adjacent parallel elements defining alternate gas and liquid spaces, each element having at least one horizontal bottom portion provided with at least one row of apertures and at least one upright wall portion provided with an upper row of openings, each element being generally U-shaped in cross-section and including said upright wall portions each having a terminal portion which is outwardly bent and is connected with a terminal portion of the upright wall portion of an adjacent element to define one of the gas spaces, said upper row of openings being formed in the upper part of the upright wall portions and the elements being fixed by their bottom portions to a peripheral crown, said distributor being supported in the column by means of its peripheral crown, and at least one organized packing section directly supported by the terminal portions of the upright wall portions of the elements of the distributor.

10. The column according to claim 9 wherein the packing section is of the undulated-crossed type.

11. The column according to claim 10, wherein the packing section includes plates disposed perpendicularly to the elements of the distributor.

12. The column according to claim 9 comprising at least upper and lower packing sections, each supported by a distributor, and including braces disposed between the distributor and the lower packing section.

13. The column according to claim 12 wherein the packing sections include lining plates that are parallel to one another.

14. The column according to claim 13 wherein the braces comprise aligned plate elements fixedly mounted on the bottom portions of the elements of the distributor.

15. In a packed heat and material exchange column, a liquid distributor comprising:
- a series of parallel elements, each element having parallel upright walls with upper and lower ends, a top structure for interconnecting the upper ends to define downwardly open gas passages, a bottom portion for interconnecting the lower ends to define upwardly open liquid collecting troughs, each upright wall being formed with a row of openings adjacent its upper end for passing gas therethrough and the bottom portion being formed with at least one row of apertures to drip liquid therethrough;
- a peripheral ring structure secured to the bottom portions of respective elements for defining a peripheral channel in liquid flow communication with each trough and for supporting the distributor in the exchange column; and
- upper and lower packings between which the distributor is interposed, the upper packing being supported directly on the top structures of the elements.

16. The column of claim 15, further comprising liquid flow guiding means disposed within the troughs.

17. The column of claim 15, comprising first conduit means extending from outside the column through the elements and opening into at least part of the troughs.

18. The column of claim 17, comprising second conduit means extending from outside the column through the elements and opening into at least part of the gas passages.

19. The column of claim 15, wherein at least the upper packing is an organized metal packing having parallel undulating metal plates arranged perpendicular to the elements.

20. The column of claim 19 further comprising spacing members interposed between the distributor and the lower packing and secured to the bottom portions of the elements.

* * * * *

UNITED STATES PATENT AND TRADEMARK OFFICE
CERTIFICATE OF CORRECTION

PATENT NO. : 5,132,055
DATED : July 21, 1992
INVENTOR(S) : Jean-Francois Alleaume et al.

It is certified that error appears in the above-identified patent and that said Letters Patent is hereby corrected as shown below:

Claim 13, line 2 (column 7, line 38), delete "lining".

Signed and Sealed this

Tenth Day of August, 1993

Attest:

MICHAEL K. KIRK

*Attesting Officer*   Acting Commissioner of Patents and Trademarks

UNITED STATES PATENT AND TRADEMARK OFFICE
CERTIFICATE OF CORRECTION

PATENT NO. : 5,132,055
DATED : July 21, 1992
INVENTOR(S) : Jean-Francois Alleaume et al.

It is certified that error appears in the above-identified patent and that said Letters Patent is hereby corrected as shown below:

On the title page, Item [75], in the list of inventors, after "Francois Darchis, Oakland, Calif." add --Bruno Leprince-Ringuet, Wilmington, Delaware--.

Signed and Sealed this

Twenty-sixth Day of October, 1993

Attest:

BRUCE LEHMAN

*Attesting Officer*  *Commissioner of Patents and Trademarks*